R. B. ARMENTRAUT.
PLOW.
APPLICATION FILED JAN. 13, 1913.
1,131,026.
Patented Mar. 9, 1915.
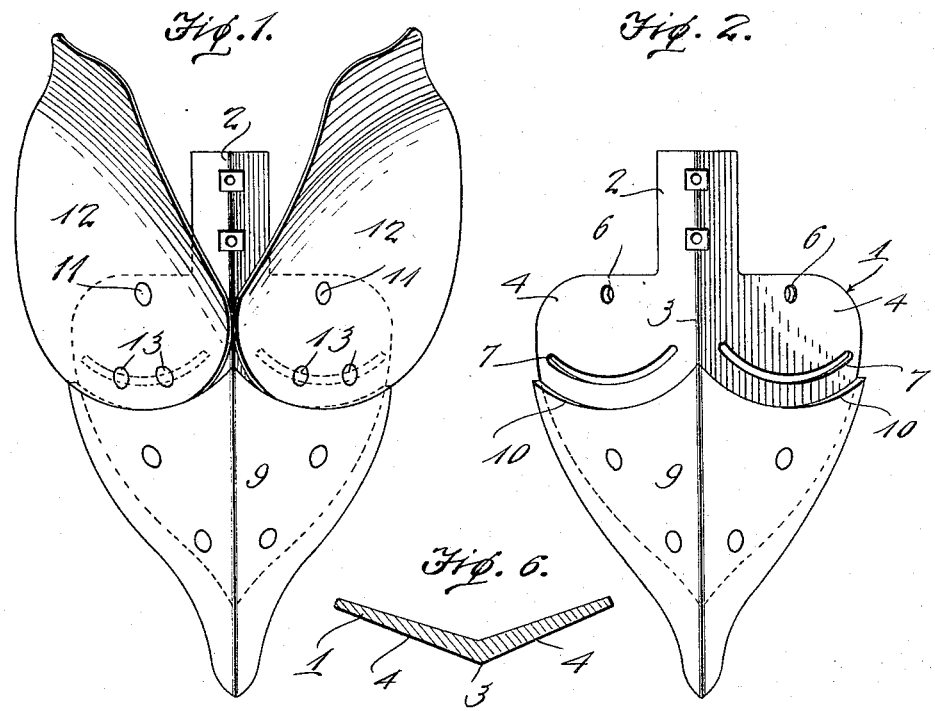
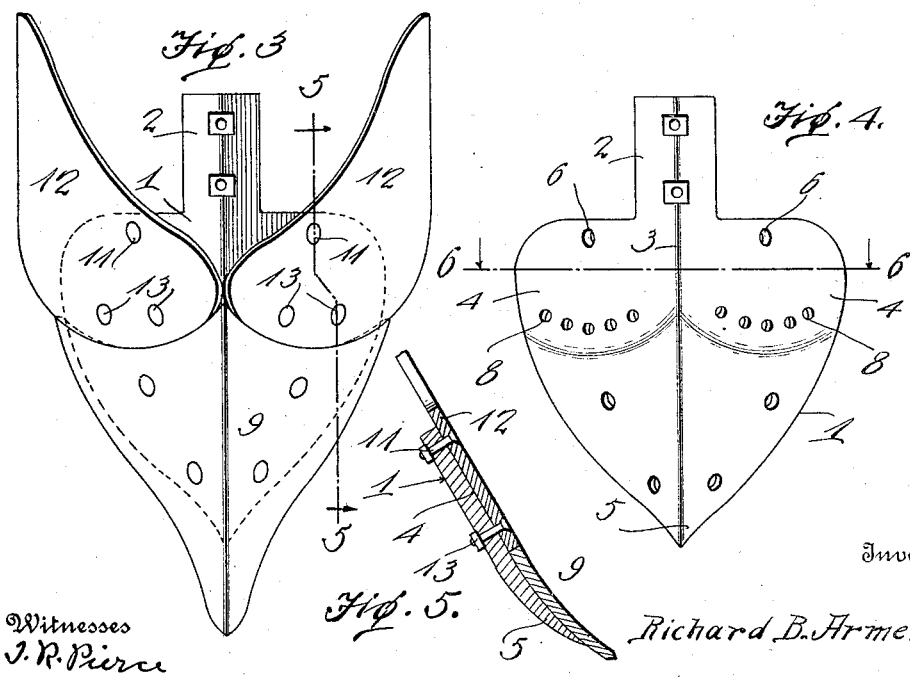

UNITED STATES PATENT OFFICE.

RICHARD B. ARMENTRAUT, OF EDEN, TEXAS.

PLOW.

1,131,026.  Specification of Letters Patent.  Patented Mar. 9, 1915.

Application filed January 13, 1913. Serial No. 741,807.

*To all whom it may concern:*

Be it known that I, RICHARD B. ARMENTRAUT, a citizen of the United States, residing at Eden, in the county of Concho and State of Texas, have invented certain new and useful Improvements in Plows; and I do declare the following to be a full, clear, and exact description of the invention, such as will enable others skilled in the art to which it appertains to make and use the same.

This invention relates to improvements in plows and more particularly to those having laterally extending adjustable wings for controlling the outward throw of the soil.

The object of the invention is to provide a plow of this character which may be cheaply manufactured in different sizes and will be applicable to different styles of plow and cultivator standards. This and other objects are carried out by the construction herein described and claimed and as shown in the drawings wherein:

Figure 1 is a front elevation of my invention showing one style of wings which I employ; Fig. 2 is a similar view with the wings removed; Fig. 3 is a view similar to Fig. 1 showing another style of wings which I may use; Fig. 4 is a front elevation of the supporting plate or foot of my plow; Fig. 5 is a detail section on line 5—5 of Fig. 3, and Fig. 6 is a detail section on line 6—6 of Fig 4.

In the accompanying drawings, the numeral 1 designates a substantially heart-shaped supporting plate or foot of my improved plow and 2 denotes a short apertured attaching shank thereof. The sides of the foot 1 preferably flare backwardly from its forward edge 3 to produce a structure substantially V shaped in horizontal section and are flat for the majority of their lengths as shown at 4. The lower end of this foot however may be curved forwardly as at 5 to facilitate engagement with the ground. Near the upper edge of each flat portion 4 is a pivot hole 6, and struck on an arc from this hole is a slot 7 (Fig. 2) or a series of bolt holes 8 (Fig. 4). Detachably bolted to the forwardly curved portion of the foot is a similarly shaped plow point 9 having its upper end recessed at 10 on arcs connecting concentric to the slots 7 or the series of holes 8. Pivoted to the flat upper faces 4 of the foot by bolts 11, are soil deflecting wings 12 having pairs of spaced bolt holes adapted to register with the slots 7 or the holes 8 and to receive bolts 13 whereby the wings are adjustably secured to the foot 1. It will be noted that the curvature of the lower ends of the wings conforms, as nearly as possible to the curvature of the recesses 10 and closely assembled thereby forming a smooth mold board and preventing the soil from accumulating thereon. By this structure, it will be seen that I have produced a plow of this character which is very simple in construction, it being unnecessary to form recesses in the foot for the reception of either the wings or the point the same effect, however, being produced.

From the foregoing description, taken in connection with the accompanying drawings, the construction and operation of the invention will be readily understood without requiring a more extended explanation.

By securing the adjustable wings 12 in position by the provision of a pair of clamping bolts 13, for each wing, said wings are allowed a wider range of adjustment since, should it become necessary to swing the wings outwardly, the innermost bolts 13 could be removed thereby allowing said wings to be swung outwardly to a greater extent than would be possible were said innermost bolts 13 allowed to remain in their respective positions. It will also be noted, that by constructing the device as described and illustrated, an extremely simple structure is obtained and that alterations to the remaining features of the invention need not be made for the purpose of applying a new plow point 9 in place of one excessively worn.

What I claim is:

In a plow comprising a substantially heart-shaped supporting plate with an integral attaching shank projecting from the center of its upper end, said plate being substantially V-shaped in cross section and having a pivot opening on each side near its upper end, an arcuate slot disposed beneath each of the pivot openings and struck from the same as a center, a shield shaped plow point substantially V-shaped in cross section to conform with the shape of the plate and secured to the lower part of the latter, a pair of arcs formed by the upper edge of said point with their inner ends converged at the center of said top edge and the said arcs being spaced below and concentric with the arcuate slots that are disposed on each side of the said supporting plate, a pair of soil deflecting wings pivotally mounted on the pivot openings near the top of the supporting plate, said wings having clamping bolts carried near their lower ends to project through the said arcuate slots below the pivot holes to hold the wings in any desired adjusted position, the lower inner edges of said wings are adapted to lightly contact with one another as the same are swung on the plate, and the lower edges of said wings are rounded to conform with the arcs on the upper edges of the plow point and having a sliding frictional engagement with the same, thereby maintaining said engagement at any adjusted position of the wings with the plow point.

In testimony whereof I have hereunto set my hand in presence of two subscribing witnesses.

RICHARD B. ARMENTRAUT.

Witnesses:
W. F. MALLEY,
J. F. CANE.

Copies of this patent may be obtained for five cents each, by addressing the "Commissioner of Patents, Washington, D. C."